US011208838B2

(12) United States Patent
Robison et al.

(10) Patent No.: US 11,208,838 B2
(45) Date of Patent: Dec. 28, 2021

(54) WINDOW CLIP RELEASE SYSTEM

(71) Applicant: TOYOTA MOTOR ENGINEERING & MANUFACTURING NORTH AMERICA, INC., Plano, TX (US)

(72) Inventors: Scott P. Robison, Dexter, MI (US); Scott L. Frederick, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 135 days.

(21) Appl. No.: 16/419,833

(22) Filed: May 22, 2019

(65) Prior Publication Data
US 2020/0370358 A1 Nov. 26, 2020

(51) Int. Cl.
*B60J 1/16* (2006.01)
*E05F 15/72* (2015.01)
*E05D 15/16* (2006.01)
*F16B 33/00* (2006.01)
*E05F 15/40* (2015.01)

(52) U.S. Cl.
CPC ............ *E05F 15/72* (2015.01); *E05D 15/165* (2013.01); *E05F 15/40* (2015.01); *F16B 33/002* (2013.01); *E05Y 2900/55* (2013.01)

(58) Field of Classification Search
CPC ..... F16B 33/002; F16B 39/00; E05Y 2900/55
USPC ........... 411/349, 549, 552, 553; 49/374, 375
See application file for complete search history.

(56) References Cited

U.S. PATENT DOCUMENTS

| 2,368,799 | A | * | 2/1945 | Barlow | F16B 5/10 411/552 |
| 3,169,293 | A | * | 2/1965 | Neuschotz | F16B 21/04 411/552 |
| 3,466,802 | A | * | 9/1969 | Juozas | E05F 11/382 49/428 |
| 4,829,711 | A | * | 5/1989 | Sambor | E05F 11/486 49/211 |
| 4,848,032 | A | * | 7/1989 | Ballor | B60J 1/17 49/350 |
| 5,502,926 | A | * | 4/1996 | Grace | E05F 11/385 411/103 |
| 5,599,148 | A | * | 2/1997 | Hirose | B60N 3/046 411/112 |

(Continued)

FOREIGN PATENT DOCUMENTS

DE         198 55 355 A1    6/2000
EP            0 748 709 A1    12/1998
WO     WO 2006/103305 A1    10/2006

*Primary Examiner* — Jerry E Redman
(74) *Attorney, Agent, or Firm* — Oblon, McClelland, Maier & Neustadt, L.L.P.

(57) ABSTRACT

A clip release system for a vehicle door includes: a clip including a stem and a clamping portion configured to hold a window; a lock including at least one guide extending from the first axial surface to the second axial surface, the lock being disposed in the stem of the clip; a bolt that rotates between a first position and a second position, is inserted through the hole of the lock in an insertion direction, and biased to move out of the lock in a direction opposite the insertion direction, the bolt including a head at a first end of the bolt, a shaft extending to a second end of the bolt, and at least one locking tab disposed on a surface of the shaft and configured to pass through the at least one guide.

16 Claims, 9 Drawing Sheets

(56) References Cited

U.S. PATENT DOCUMENTS

| | | | |
|---|---|---|---|
| 5,622,005 A * | 4/1997 | Ochenski | B60J 1/17 49/375 |
| 5,690,460 A * | 11/1997 | Attanasio | F16B 5/10 411/551 |
| 5,729,930 A * | 3/1998 | Schust | E05F 11/483 49/375 |
| 5,966,872 A * | 10/1999 | Wasek | E05F 11/385 49/348 |
| 6,341,748 B1 | 1/2002 | Brooks et al. | |
| 6,364,404 B1 | 4/2002 | De Paoli | |
| 6,460,296 B1 * | 10/2002 | Arquevaux | E05F 11/382 411/119 |
| 6,676,176 B1 * | 1/2004 | Quandt | E05B 9/08 292/202 |
| 7,596,908 B2 * | 10/2009 | Rothe | E05F 11/385 49/349 |
| 7,637,554 B2 | 12/2009 | Kurokawa et al. | |
| 8,096,080 B2 * | 1/2012 | Pavlovic | E05F 11/382 49/348 |
| 8,333,036 B2 | 12/2012 | Helms et al. | |
| 8,430,615 B2 * | 4/2013 | Chen | H01L 23/4093 411/107 |
| 8,491,246 B2 * | 7/2013 | Chao | F16B 21/02 411/349 |
| 8,756,866 B2 * | 6/2014 | Lee | F16B 5/0685 49/375 |
| 8,773,857 B2 * | 7/2014 | Yang | H01L 23/40 361/709 |
| 8,904,711 B2 * | 12/2014 | Lopez | B60J 1/007 49/372 |
| 8,943,750 B2 * | 2/2015 | Twork, Jr. | E05F 11/385 49/352 |
| 9,023,177 B2 * | 5/2015 | Hardin | C23C 16/4401 156/345.34 |
| 10,876,344 B2 * | 12/2020 | Taubmann | E05F 11/385 |
| 2002/0017061 A1 * | 2/2002 | Nicolai | E05F 11/385 49/375 |
| 2003/0093960 A1 * | 5/2003 | Mizusawa | E05F 11/385 52/204.62 |
| 2004/0025441 A1 * | 2/2004 | Blume | B60J 5/0416 49/506 |
| 2004/0088924 A1 * | 5/2004 | Moser | E05F 11/385 49/375 |
| 2006/0260200 A1 * | 11/2006 | Bigourden | E05F 11/385 49/374 |
| 2013/0056192 A1 * | 3/2013 | Lee | F16B 41/002 165/185 |

* cited by examiner

WINDOW CLIP RELEASE SYSTEM

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polycarbonate windows are being adopted more often in the automotive sector due to myriad advantages including mass savings, shape flexibility, and strength as compared to tempered glass. However, due to its strength and tolerance to breaking, egress of passengers or access to passengers from the exterior by emergency personnel through any windows occupied by polycarbonate panels may be hindered if the polycarbonate panel is not removed quickly. Thus, a system and apparatus for rapid elimination of a polycarbonate window obstacle is desired, in particular during a vehicular accident.

SUMMARY

The present disclosure relates to a clip release system for a vehicle door, including: a clip including a stem and a clamping portion configured to hold a window; a lock including a hole having an inner diameter, a first axial surface, a second axial surface, and at least one guide extending from the first axial surface to the second axial surface, the lock being disposed in the stem of the clip; a bolt that rotates between a first position and a second position, is inserted through the hole of the lock in an insertion direction, and biased to move out of the lock in a direction opposite the insertion direction, the bolt including a head at a first end of the bolt, a shaft extending to a second end of the bolt, and at least one locking tab disposed on a surface of the shaft and configured to pass through the at least one guide, wherein in the first position, the at least one locking tab is misaligned with the at least one guide and the at least one locking tab engages the second axial surface of the lock to prevent the bolt from disengaging from the lock; and in the second position, the at least one locking tab is aligned with the at least one guide and allows the bolt to disengage from the lock.

The present disclosure additionally relates to a clip release system for a vehicle door, including: a clip including a stem, a clamping portion configured to hold a window, a through-hole disposed on the stem, and a support structure disposed on the stem proximal to the through-hole; a bolt inserted through the through-hole of the stem in an insertion direction and biased to move out of the lock in a direction opposite the insertion direction, the bolt including a head at a first end of the bolt, a shaft extending to a second end of the bolt, and a magnet disposed at a second end of the bolt; and an electromagnet disposed in the support structure proximal to and opposite the magnet along the insertion direction and configured to receive a voltage, wherein the electromagnet generates a first magnetic field to attract the magnet of the bolt.

The foregoing paragraphs have been provided by way of general introduction, and are not intended to limit the scope of the following claims. The described aspects, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
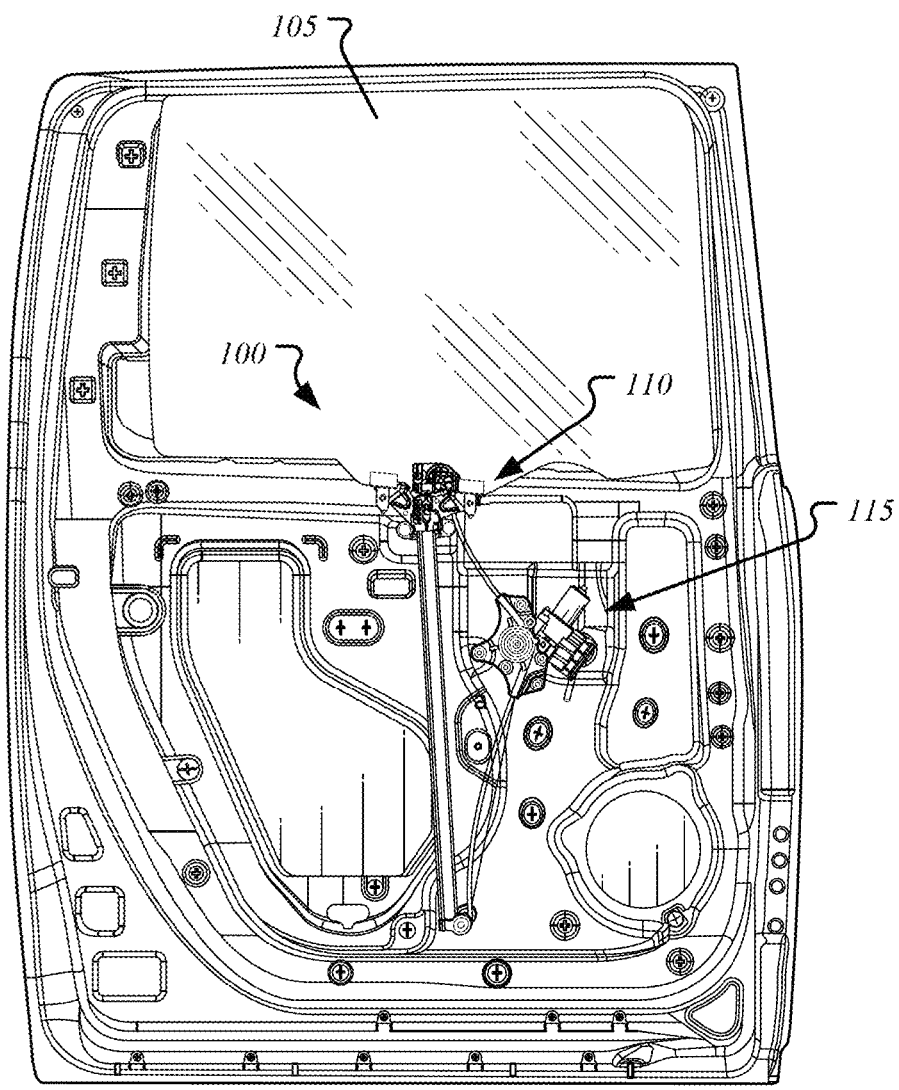
FIG. 1A is a perspective view of a vehicle door including a window attached to a clip release system, according to an exemplary aspect of the present disclosure.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "top," "bottom," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Polymer-based windows provide an alternative to glass that is optically transparent while exhibiting greater strength and reduced weight for similar performance. When combined in a layered structure with glass, polymers, such as polycarbonate, may be utilized as impact and bullet-resistant windows that withstand multiple impacts from high-force objects. While these polycarbonate windows possess many advantages for use in vehicles and structures, their use may present an obstacle in a scenario where a user desires to remove the polycarbonate window in order to gain access to the interior of the vehicle or structure quickly. For example, in a vehicular collision, emergency personnel may remove a glass window quickly via a removal tool, such as an axe or a pick, in order to extricate a driver. In another example, emergency personnel responding to a structure fire may break the glass panel on a door in order to unlock said door and gain access to the interior of the structure. In the case of polycarbonate windows, the polycarbonate window may not break upon impact with the removal tool. In fact, it may withstand multiple impacts, which may delay entry from the exterior or egress from the interior. Thus, as described herein, the present disclosure describes a system which rapidly disengages the polycarbonate window from the point of entry or egress.

FIG. 1A shows a perspective view of a vehicle door including a window 105 attached to a clip release system 100, according to an exemplary aspect of the present disclosure. In an aspect, the window 105 may be in a closed configuration or an open configuration. When in the closed configuration, the window 105 may form a seal with the vehicle door, and when the window 105 is displaced to break the seal, the window may be in the open configuration. The window 105 may be fabricated from a substantially transparent polymer, for example polycarbonate. The window 105 may be fabricated as a multi-layer structure with alternating layers of polymer and glass. For example, the window 105 may be used in armored vehicles as bullet-resistant windows.

In an aspect, the clip release system 100 may include a regulator 110 mounted on a sliding bar. A cable may connect the regulator 110 to a motor 115, wherein a cable loop is formed from the motor 115 to a first pulley at a first end of the sliding bar closest to a top of the vehicle door, to the regulator 110, to a second pulley at a second end of the sliding bar farthest from the top of the vehicle door, and back to the motor 115. Thus, in a configuration typical of vehicles, the vehicle door shown in FIG. 1 may be installed wherein an opening for the window 105 is displaced farthest from the ground and the window 105 in the closed configuration is concomitantly displaced farthest from the ground and towards the top of the vehicle door. The sliding bar may be oriented vertically with respect to the ground, and the window 105 may translate upwards to move to the closed configuration or downwards to move to the open configuration. That is to say, once the seal between the vehicle door and the window 105 is broken and the door adopts the open configuration, translating the window 105 downwards makes the window 105 more open. The regulator 110 may be attached to the cable and the motor 115 may be configured to drive the cable around the loop in predetermined directions to translate the regulator 110 along the sliding bar. The window 105 may be attached to the regulator 110 and therefore moves up and down according to movement of the regulator 110. For example, as shown in FIG. 1, the regulator 110 may be disposed near the top of the vehicle door wherein the window 105 is in the closed configuration. The motor 115 may drive the cable in a counter-clockwise direction which may translate the regulator downwards along the sliding bar, which thus lowers the window 105 to the open configuration. It may be appreciated that the placement of the components shown is merely one example and the motor 115 may be displaced on another side of the sliding bar such that the cable driven in the same counter-clockwise direction may translate the regulator 110 upwards along the sliding bar, which would raise the window 105. The vehicle door window 105 movement may be controlled by a user inside the vehicle cabin or remotely by a user with a remote control.

Figure 1B:
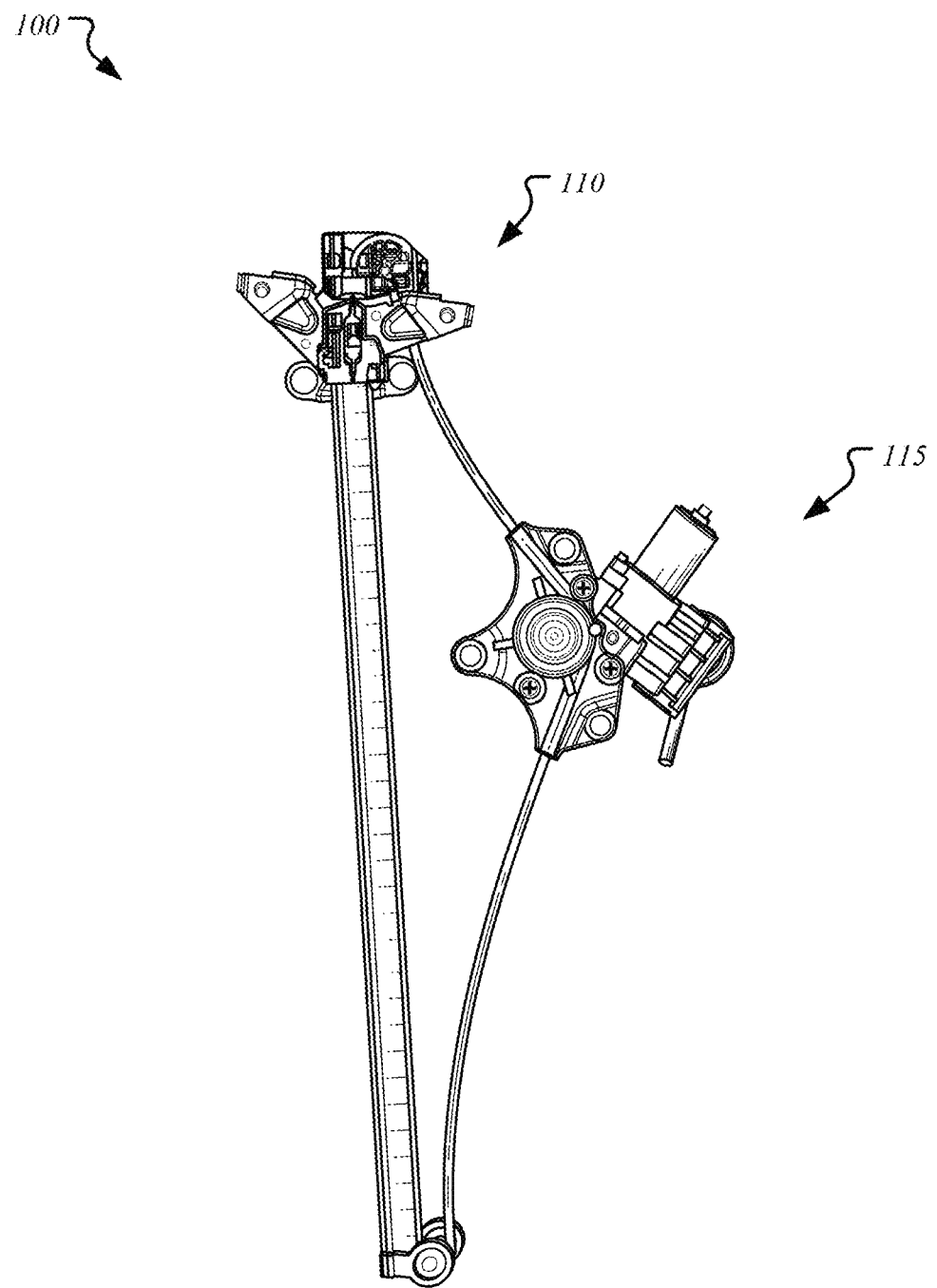
FIG. 1B is a perspective view of a clip release system 100 independent from a vehicle door, according to an exemplary aspect of the present disclosure.

FIG. 1B shows a perspective view of the clip release system 100 independent from the vehicle door, according to an exemplary aspect of the present disclosure. As previously described, the clip release system 100 includes the regulator 110, the motor 115, and the sliding bar with the first pulley at the first end of the sliding bar and the second pulley at the second end of the sliding bar. In another aspect, the cable-type clip release system 100 may be utilized in a gear-type system for controlling the window movement.

Figure 2:
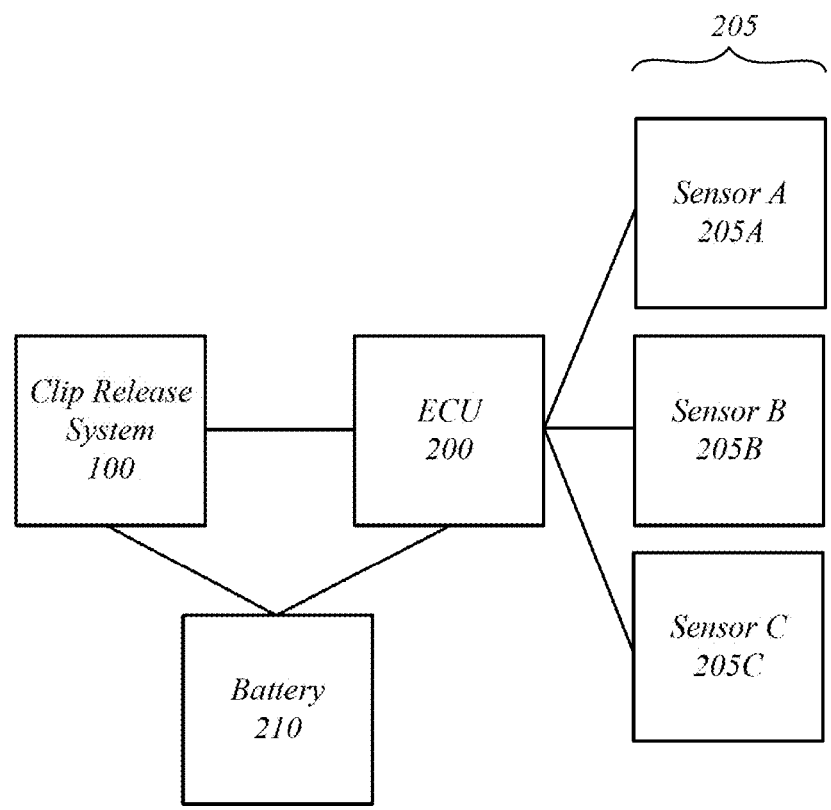
FIG. 2 is a block diagram of a clip release system electrically connected to an electronic control unit (ECU), according to an exemplary aspect of the present disclosure.

FIG. 2 shows a block diagram of the clip release system 100 electrically connected to an electronic control unit (ECU) 200, according to an exemplary aspect of the present disclosure. In an aspect, the ECU 200 may include processing circuitry and be electrically connected to other vehicle sensors 205 and systems (not shown), for example a collision sensor 205A and an airbag system. The ECU 200 may be configured to receive input from the sensors 205. Based on data from the sensors 205, the ECU 200 may determine that an event has occurred and perform a predetermined action. For example, the ECU 200 may determine from the collision sensor 205A that a collision has occurred and subsequently actuate the inflation of airbags in the vehicle via the airbag system. A battery 210 may be electrically connected to the clip release system 100 and the ECU 200 and configured to provide electrical energy.

Figure 3A:
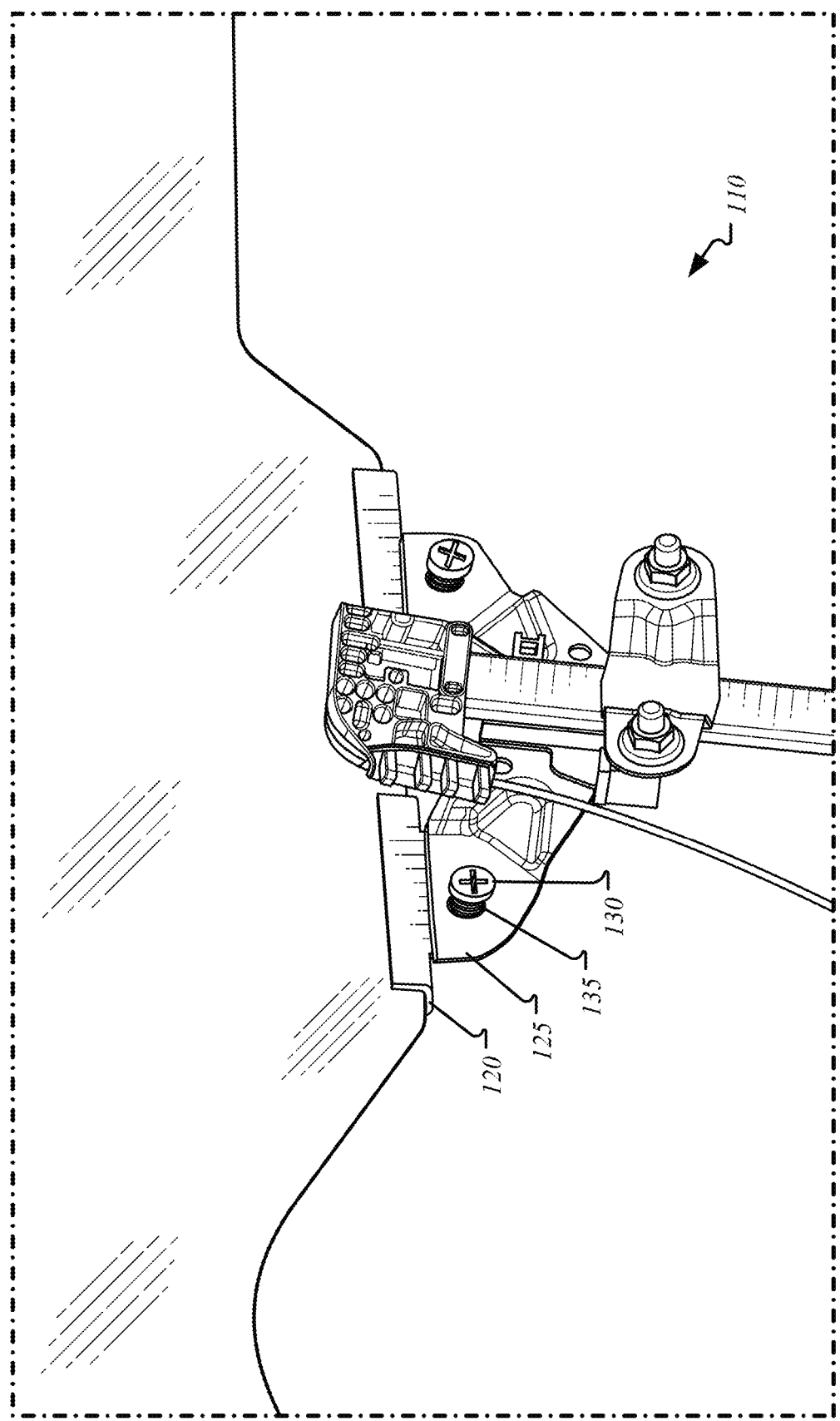
FIG. 3A is a perspective view of a window attached to a regulator, according to an exemplary aspect of the present disclosure.
Figure 3B:
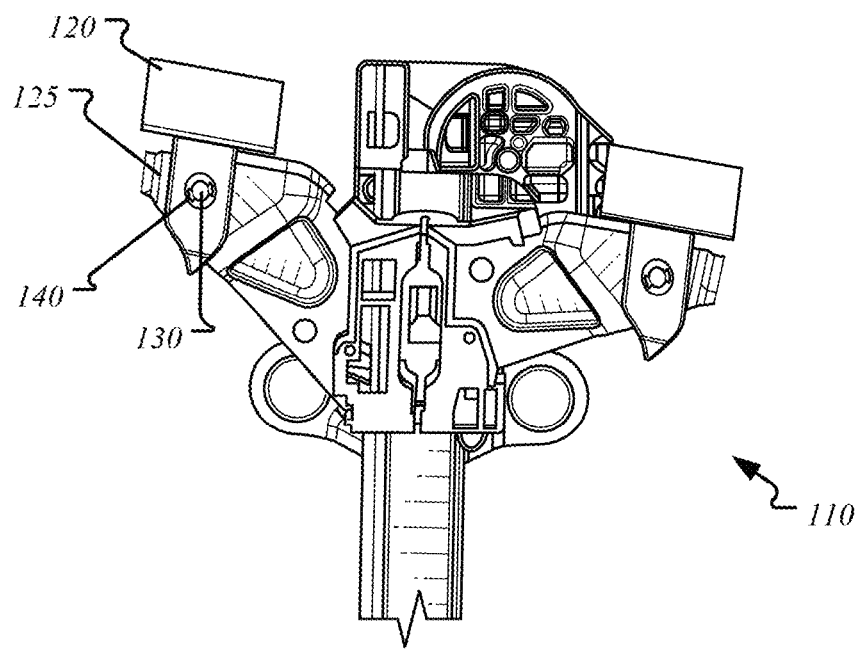
FIG. 3B is a perspective view of a regulator, according to an exemplary aspect of the present disclosure.

FIG. 3A shows a perspective view of the window 105 attached to the regulator 110, according to an exemplary aspect of the present disclosure. For simplicity, the view of the regulator 110 as shown in FIG. 3A may be from the perspective of the user in an interior of the vehicle when the clip release system 100 is installed in the vehicle door. As such, this will be described as the interior view herein, but it may be appreciated that the clip release system 100 may be installed in various orientations in the vehicle door. FIG. 3B shows a perspective view of the regulator 110, according to an exemplary aspect of the present disclosure. For simplicity, the view of the regulator 110 as shown in FIG. 3B may be from the perspective of the user from an exterior of the vehicle when the clip release system 100 is installed in the vehicle door. As such, this will be described as the exterior view herein, but similarly, it may be appreciated that the clip release system 100 may be installed in various orientations in the vehicle door. For example, all the components may be rotated 180 degrees about the axis of the sliding bar and installed in the vehicle door. In such an example, the interior view would become the exterior view, and vice versa, without penalty to the functionality of the clip release system 100.

Figure 3C:
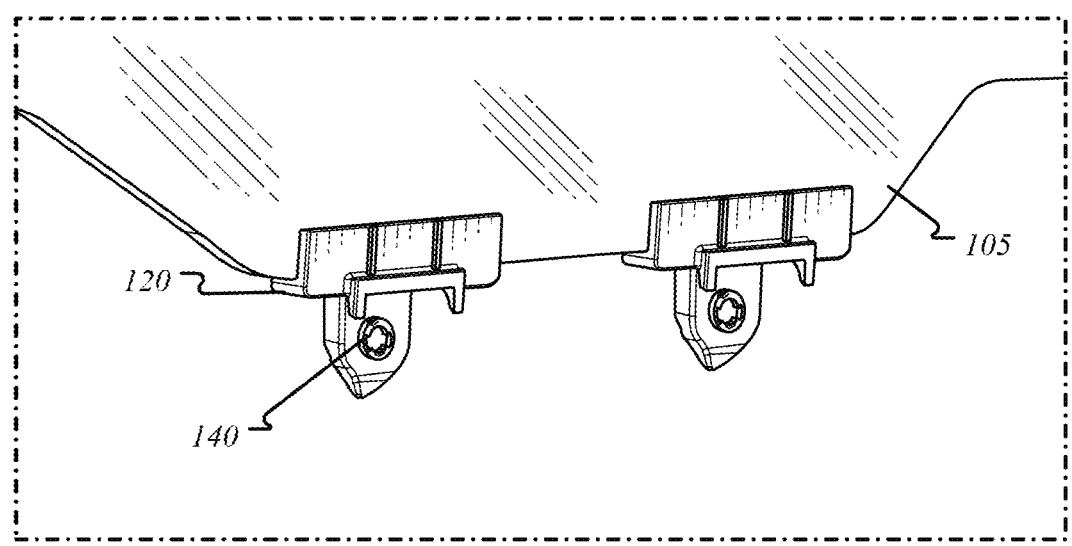
FIG. 3C is a perspective view of a window held by a clip, according to an exemplary aspect of the present disclosure.

FIG. 3C shows a perspective view of the window 105 held by a clip 120, according to an exemplary aspect of the present disclosure. In an aspect, the regulator 110 includes a bracket 125. The clip release system 100 may further include the clip 120, wherein the window 105 may be held by the clip 120 and subsequently fastened to the bracket 125. It may be appreciated that more than one bracket 125 and clip 120 may be used in the regulator 110 to hold the window 105, for example two brackets 125 and two clips 120 (as shown). The clip 120 may include a clamping portion substantially equal to or narrower than a thickness of the window 105. The clamping portion of the clip 120 may be configured to receive the window 105 inserted therein, wherein the clamping portion of the clip 120 may partially deform around the inserted window 105 to hold the window 105 via friction forces. Additional chemical or mechanical means may be utilized in order to further increase the holding strength of the clip 120. For example, an adhesive compound such as glue may be applied to the interior of the clip 120 clamping portion to increase the holding force between the window 105 and the clip 120.

In an aspect, the clip 120 may be fastened to the bracket 125 using a bolt 130 and a spring 135. The clip 120 may include a lock 140 that is disposed along a portion of the clip 120, for example on a stem of the clip 120, and the bolt 130 may insert into the lock 140 through an opening on the bracket 125. The spring 135 may wrap around a shaft of the bolt 130, wherein the spring 135 compresses against a first surface of the bracket 130 and the spring 135 exerts force on the bolt 130 perpendicular to the first surface and in a direction opposite to the insertion of the bolt 130. Thus, a diameter of the shaft of the bolt 130 may be slightly narrower than a diameter of the lock 140.

Figure 4A:
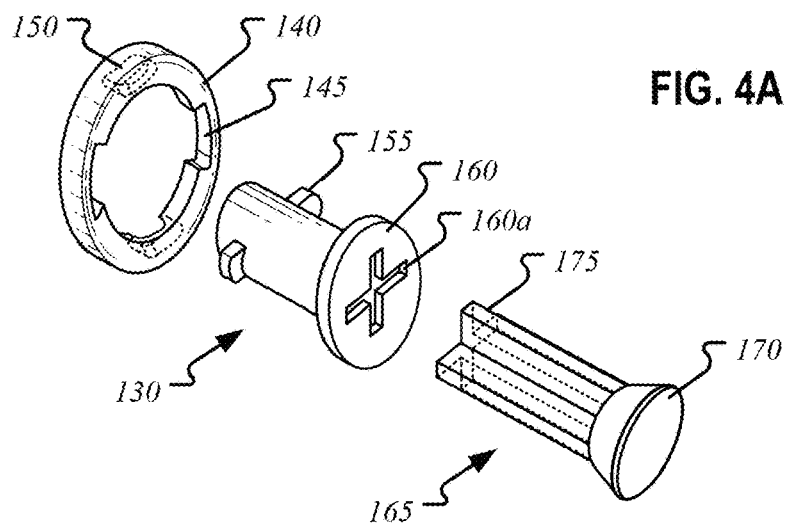
FIG. 4A is a perspective view of a bolt and a lock, according to an exemplary aspect of the present disclosure.

FIG. 4A shows a perspective view of the bolt 130 and lock 140, according to an exemplary aspect of the present disclosure. In an aspect, the bolt 130 includes a head 160 at a first end of the bolt and at least one locking tab 155 disposed along the exterior of the shaft, for example proximal to a second end of the shaft. Disposed on the surface of the head 160 may be a bolt drive 160a. The bolt drive 160a may be a predetermined shaped cavity or external head 160 shape configured to mate with a mating tool in order to rotate the bolt 130 when a rotating force is applied. Non-limiting examples of the bolt drive 160a shape include at least one of slotted, cruciform (as shown), external polygon, internal polygon, hexalobular, three-pointed, and special, or any combination thereof. The bolt 130 may be fabricated from a polymer or a metal and using a method such as injection molding or die casting.

In an aspect, a shape of the lock 140 may be, for example, substantially annular (as shown). The lock 140 may be molded as part of the clip 120 stem, or fabricated separately and attached to the clip 120. For example, the clip 120 may be made of a polymer material and injection molded with the lock 140 integrated into the mold of the clip 120. For example, the clip 120 may be made from a polymer material and injection molded with a circular open volume in the stem of the clip 120, and the lock 140 may be made from a polymer material and injection molded separately. The lock 140 may be subsequently installed in the circular open volume in the stem of the clip 120. For example, the clip 120 may be made from a metal and CNC machined. The annular shape of the lock 140 may include a hole having an inner diameter (i.e. the bore), an outer diameter, a first axial surface, and a second axial surface. The bracket 125 may include an interior surface and an exterior surface. The clip 120 may be fastened to the bracket 125 wherein when the clip 120 is fastened to the bracket 125, the first axial surface faces the interior of the vehicle and engages the exterior surface of the bracket 125.

The lock 140 includes at least one guide 145, wherein the at least one guide 145 may be an indentation along the hole from the inner diameter towards an outer diameter of the lock 140 that extends from the first axial surface through to the second axial surface. The removed material may increase the maximum width spanning the interior of the lock 140, herein referred to as an intermediate diameter. The at least one locking tab 155 may increase the maximum width through the middle of the bolt 130 cross section, herein referred to as a locking diameter. The shape of the guide 145 may be determined based on the locking diameter, wherein the intermediate diameter may be substantially equal to or slightly larger than the locking diameter in order to allow the bolt 130 to be inserted into the lock 140. Notably, the at least one locking tab 155 is configured to pass through the at least one guide 145 when the at least one locking tab 155 and the at least one guide 145 are aligned during insertion or ejection. Rotation of the bolt 130 to an orientation wherein the at least one locking tab 155 is misaligned with the at least one guide 145 may prevent the bolt 130 from passing through the lock 140.

In an aspect, the bolt 130 is configured to rotate to an orientation wherein the at least one locking tab 155 is aligned with the at least one guide 145, insert through the lock 140, and rotate to an orientation wherein the at least one locking tab 155 is misaligned with the at least one guide 145 in order to prevent ejection of the bolt 130 from the lock 140. The bolt 130 may be inserted and rotated via a plunger 165. The plunger 165 may include a top 170 and a body 175. The body 175 may adopt a predetermined mated shape based on the shape of the bolt drive 160a. The mated shape of the body 175 may be slightly smaller in cross-sectional dimensions and configured to mate with the bolt drive 160a to enable rotation of the bolt 130 via rotation of the plunger 165. For example, the mated shape of the body 175 may be cruciform (as shown). The plunger 165 may be coupled to the motor 115. The motor 115 may be configured to rotate the plunger 165, and thus the bolt 130, into alignment and push the bolt 130 through the lock 140. The spring 135 wrapped around the shaft of the bolt 130 may compress and begin to apply force in a direction opposite to an insertion direction. That is to say, if the plunger 165 is retracted, the spring 135 force may push the head 160 in the same direction as an ejection direction and removes the bolt 130 from the lock 140 (if the at least one locking tab 155 is aligned with the at least one guide 145). To retain the bolt 130 in the lock 140, the plunger 165 may rotate after inserting the bolt 130 into the lock 140. The rotation of the plunger 165 may rotate the bolt 130 and result in misalignment of the at least one locking tab 155 and the at least one guide 145. After rotation of the bolt 130 into the misaligned orientation, the plunger 165 may retract. The spring 135 force may push against the head 160, but due to the misaligned orientation, the at least one locking tab 155 may engage the second axial surface of the lock 140, thus preventing ejection of the bolt 130.

In an aspect, the lock 140 includes at least one notch 150. The at least one notch 150 may be a recess formed on the second axial surface. Notably, the recess (i.e. the at least one notch 150) does not extrude through to the first axial surface. That is, a depth of the recess is set between a thickness of the lock 140, wherein the thickness of the lock 140 is the distance between the first axial surface and the second axial surface. The at least one notch 150 may be configured to receive the at least one locking tab 155. For example, after the plunger 165 inserts the bolt 130 through the lock 140, the plunger 165 may rotate the bolt 130 to align the at least one locking tab 155 with the at least one notch 150 before the plunger 165 retracts. The at least one locking tab 155 may come to rest in the at least one notch 150 as the spring 135 pushes the bolt 120 in the ejection direction and forces the at least one locking tab 155 to engage the at least one notch 150. The at least one notch 150 may be configured to prevent accidental rotation of the bolt 130 once inserted into the lock 140. For example, the at least one locking tab 155 resting in the at least one notch 150 may prevent the bolt 130 from rotating to an orientation where the at least one locking tab 155 is aligned with the at least one guide 145, which would cause the bolt 130 to eject from the lock 140.

Figure 4B:
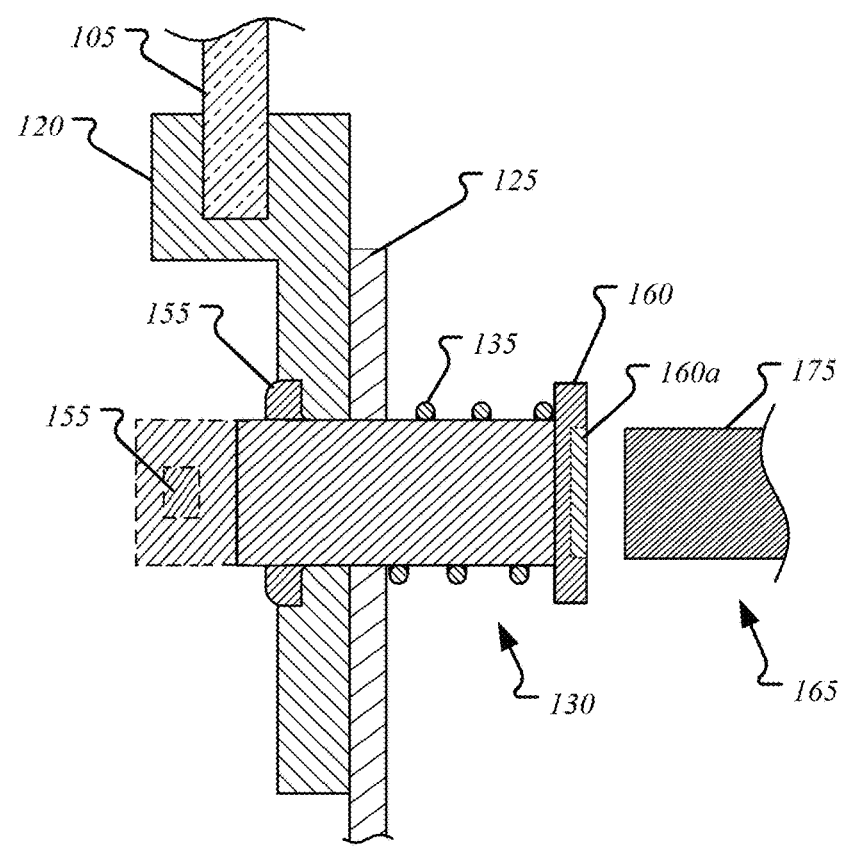
FIG. 4B is a cross-sectional view of a regulator with a clip installed to hold a window, according to an exemplary aspect of the present disclosure.

FIG. 4B shows a cross-sectional view of the regulator 110 with the clip 120 installed to hold the window 105, according to an exemplary aspect of the present disclosure. In an aspect, and similar to the previous description, the bolt 130 may be inserted into the lock 140, but the bolt 130 may pass through the bracket 125 via an opening in the bracket 125 prior to passing through the lock 140 of the clip 120. In doing so, the clip 120 may be fastened to the bracket 125 wherein the force of the spring 135 "pulls" the clip 120 to engage the bracket 125, and the shaft of the bolt 130 resists a shear force of the clip 120 and window 105 acting opposite the bracket 125 to maintain the height of the window 105. The opening in the bracket 125 through which the bolt 130 passes may be sized to allow sufficient clearance for the locking diameter of the bolt 130 and at least one locking tab 155 to pass through. The dashed outline of the second end of the bolt 130 indicates the position of the bolt 130 when first inserted and the at least one locking tab 155 is aligned with the at least one guide 145. The solid outline of the second end of the bolt 130 indicates the position of the bolt 130 after the bolt 130 is rotated, the plunger 165 is removed, and the at least one locking tab 155 engages with the at least one notch 150 due to the force of the spring 135 pushing the bolt 130 in the ejection direction.

As previously mentioned, the polycarbonate window 105 may present an obstacle for emergency personnel attempting to reach the interior of the vehicle or a user attempting to egress through the vehicle door opening, for example during an accident. In an aspect, the clip release system 100 may be configured to rapidly remove the window 105 obstacle during such an event in order to allow evacuation of the user or access to the interior of the vehicle by the emergency personnel. Upon receiving a signal from the sensors 205, the ECU 200 may actuate the motor 115 to release the bolt 130 from the lock 140. For example, the motor 115 may push the plunger 165 against the bolt 130 until the at least one locking tab 155 is clear of the recess of the at least one notch 150, then rotate the plunger 165 to rotate the bolt 130 until the at least one locking tab 155 is aligned with the at least one guide 145, and finally retract the plunger 165. As the motor 115 retracts the plunger 165, the spring 135 may push the bolt 130 out of the lock 140. When the bolt 130 is fully disengaged from the lock 140, the clip 120 holding the window 105 may freely move along or away from the bracket 125. For example, for the vehicle sitting upright with the window 105 in the closed position prior to the release of the clip 120, the window 105 and clip 120 may slide down into the vehicle door under the force of gravity once the clip 120 is released. For example, for the vehicle in a rollover accident (i.e. upside-down) with the window 105 in the closed position prior to the release of the clip 120, the user or emergency personnel may apply force to slide the window 105 (and the clip 120) away from the vehicle door opening (i.e. upwards into the upside-down vehicle door) in order for the user to evacuate through the vehicle door opening or allow emergency personnel to extract the user from the vehicle through the opening. In an aspect, a shape of the shaft of the bolt 130 may be tapered to provide easier ejection of the bolt 130 from the lock 140 as compared to a uniform shaft. For example, the diameter of the shaft may become narrower moving from the head 160 to the second end of the bolt 130 (i.e. the second end is narrower). An example of the tapered shape is shown in FIG. 5.

Figure 5:
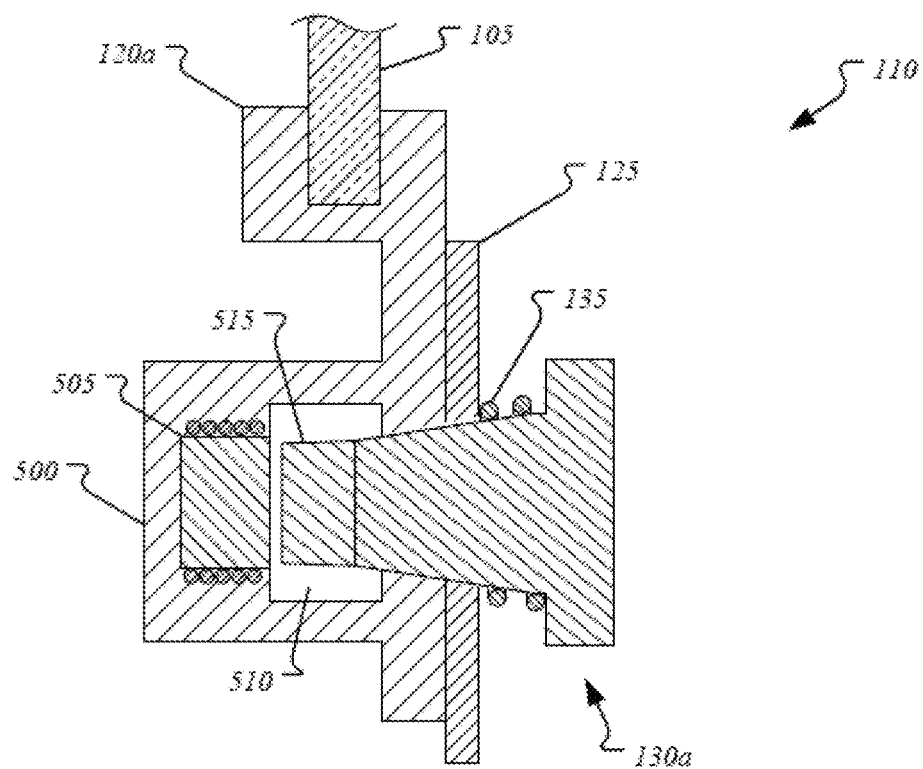
FIG. 5 shows a cross-sectional view of a regulator with a magnetic clip installed to hold a window, according to an aspect of the present disclosure.
Figure 6:
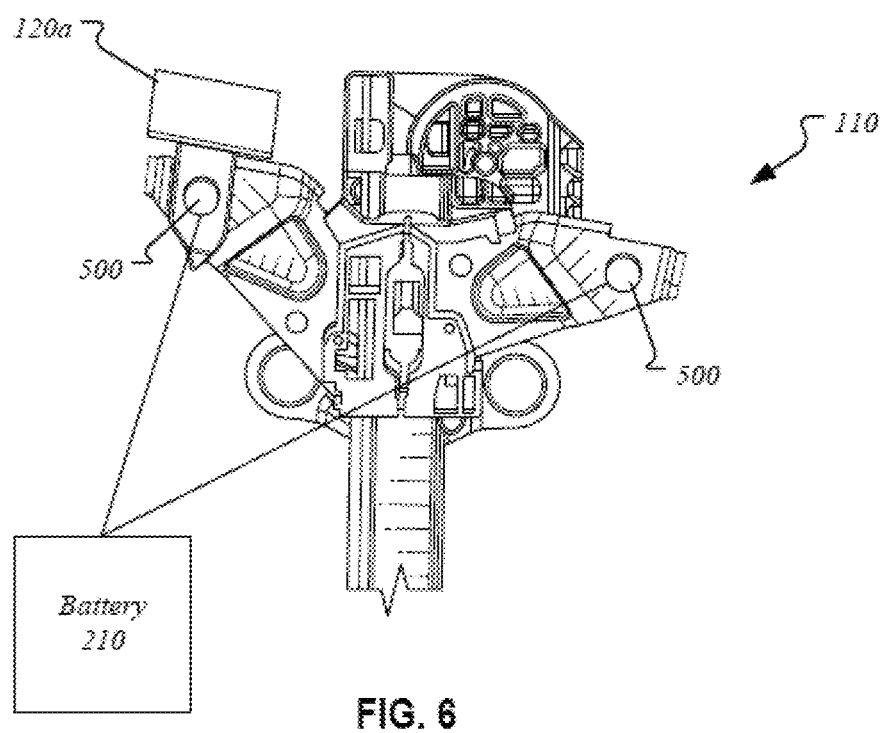
FIG. 6 is a perspective view of a regulator 110 with a magnetic clip installed, according to an aspect of the present disclosure.

FIG. 5 shows a cross-sectional view of the regulator 110 with a magnetic clip 120a installed to hold the window 105, according to an aspect of the present disclosure. FIG. 6 shows a perspective view of the regulator 110 with the magnetic clip 120a installed, according to an aspect of the present disclosure. In another aspect, the magnetic clip 120a may be structured similar to the clip 120 including an open portion to secure the window 105 and a stem portion to fasten to the bracket 125. Notably, in place of the lock 140, the stem portion may include a through-hole configured to receive a magnetic bolt 130a. Similar to the bolt 130, the magnetic bolt 130a may include a first end with a head and a second end configured to insert into the bracket 125 and the stem of the magnetic clip 120a. Notably, the magnetic bolt 130a may include a magnetic tip 515 disposed at the second end of the magnetic bolt 130a. A shaft of the magnetic bolt 130a may be tapered, wherein the diameter narrows from the first end of the magnetic bolt 130a to the second end of the magnetic bolt 130a. The magnetic clip 120a may include a support housing 500 disposed on an exterior surface of the stem. When the magnetic clip 120a is fastened to the bracket 125, an interior surface of the magnetic clip 120a engages the exterior surface of the bracket 125 and the exterior surface of the magnetic clip 120a faces away from the bracket 125. The support housing 500 may surround the through-hole on the stem of the magnetic clip 120a and form a hollow volume 510. The hollow volume 510 may be configured to receive the magnetic tip 515 at the second end of the magnetic bolt 130a. Disposed opposite the magnetic tip 515 along the insertion direction and inside of the support structure 500 may be an electromagnet 505. The electromagnet 505 may include a conductive wire wound around a metal rod and configured to receive a voltage from the battery 210 to produce a magnetic field. For example, the wire may be copper and the metal may be iron. The magnetic field may attract or repel a magnetic object, for example the magnetic tip 515.

In an aspect, the magnetic clip 120a and magnetic bolt 130 may be configured to fasten the window 105 to the bracket 125 as well as rapidly release in order to allow removal of the window 105 from the vehicle door opening. The magnetic bolt 130a may be inserted through the bracket 125 and into the hollow volume 510 of support structure 500 of the magnetic clip 120a. The electromagnet 505 may receive a voltage to produce an attractive magnetic force and attract the magnetic tip 515 of the magnetic bolt 130a. The attractive magnetic force between the magnetic tip 515 and the electromagnet 505 may "pull" the magnetic clip 120a to engage the bracket 125 on the exterior surface of the bracket 125. Similarly, the attractive magnetic force between the magnetic tip 515 and the electromagnet 505 may "pull" the head of the magnetic bolt 130a against the bracket 125 on the interior surface of the bracket 125. The magnetic bolt 130a may thus fasten the magnetic clip 120a to the bracket 125 and keep the window 105 elevated to the desired height.

In one aspect, when the ECU 200 receives a signal from the sensors 205, the ECU 200 may stop the flow of voltage from the battery 210 to the electromagnet 505. This may eliminate the attractive magnetic force between the magnetic tip 515 and the electromagnet 505 and allow ejection of the magnetic bolt 130a. For example, the spring 135 may be disposed between the head of the magnetic bolt 130a and the interior surface of the bracket 125, and the spring force applied between the head of the magnetic bolt 130a and the interior surface of the bracket 125 may push the magnetic bolt 130a out in the ejection direction.

In one aspect, when the ECU 200 receives a signal from the sensors 205, the ECU 200 may reverse the flow of voltage from the battery 210 to the electromagnet 505. The reversal of voltage flow may reverse the polarity of the electromagnet 505 and generate a repulsive magnetic force. The repulsive magnetic force may allow and assist ejection of the magnetic bolt 130a by applying the repulsive force against the magnetic tip 515 in the ejection direction.

As previously described, the disengagement of the magnetic bolt 130a may allow the magnetic clip 120a holding the window 105 to freely slide along or away from the bracket 125. For example, for the vehicle sitting upright with the window 105 in the closed position prior to the release of the magnetic clip 120a, the window 105 and magnetic clip 120a may slide down into the vehicle door under the force of gravity once the magnetic clip 120a is released. For example, for the vehicle in a rollover accident (i.e. upside-down) with the window 105 in the closed position prior to the release of the magnetic clip 120a, the user or emergency personnel may apply force to slide the window 105 (and the magnetic clip 120a) away from the vehicle door opening (i.e. upwards into the upside-down vehicle door) in order for the user to evacuate through the vehicle door opening or allow emergency personnel to pull the user from the vehicle through the opening.

Advantageously, the clip release system 100 provides a rapid unfastening of the window 105 from the regulator 110 in order to allow the user to evacuate the vehicle or emergency personnel to reach the user. Importantly, the clip release system 100 is automated based on parameters detected by the sensors 205. Thus, in an event where the user is rendered unconscious or unable to manually open the window 105, the ECU 200 automatically disengages the bolt 130 or magnetic bolt 130a to free the window 105 from the regulator 110. Therefore, this automated safety feature may enable the use of polycarbonate windows 105 in vehicles. For other types of vehicles where polycarbonate windows 105 are utilized, the automatic release may be disabled. For example, the armored vehicle described previously may include a manual activation of the disengagement of the bolt 130 or magnetic bolt 130a in order to prevent a criminal from externally activating the disengagement in order to gain unwanted access to the user in the armored vehicle. In a similar application, the polycarbonate window 105 and manual clip release system 100 may be utilized in doors for secured structures. The strength of the polycarbonate window 105 may provide resistance to high impact forces from bullets or hammers, while providing transparency for the user in the structure. The manual activation of the extraction of the bolt 130 or magnetic bolt 130a to drop the window 105 allows the user to determine when is a safe time for the window 105 to be eliminated as an obstacle for egress.

Figure 7:
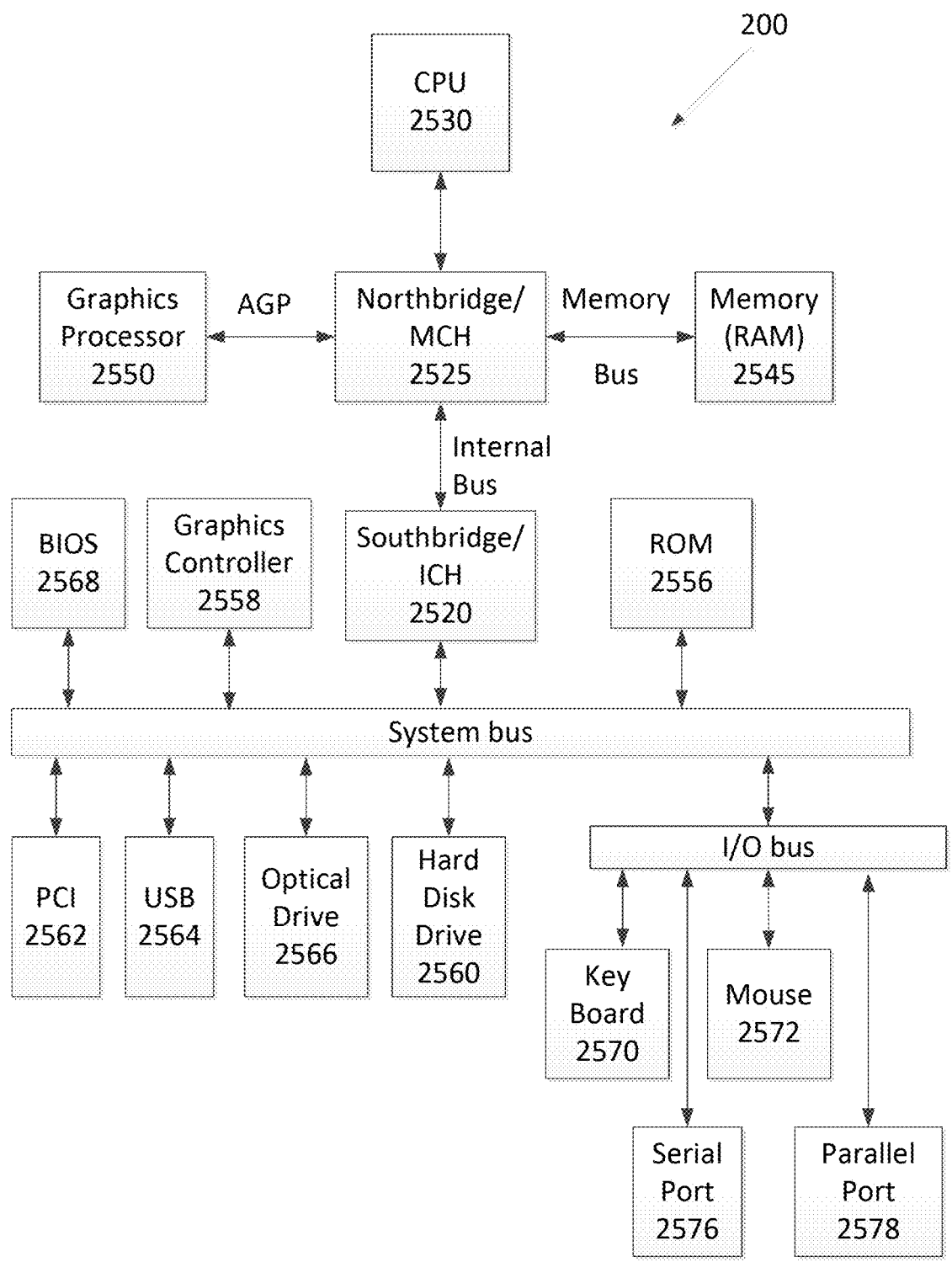
FIG. 7 is a schematic diagram of an ECU, according to an exemplary aspect of the present disclosure.

FIG. 7 is a schematic diagram of the ECU 200. The ECU 200 is an example of a computer in which code or instructions implementing the processes of the illustrative embodiments can be located.

In FIG. 7, the ECU 200 employs an application architecture including a north bridge and memory controller hub (NB/MCH) 2525 and a south bridge and input/output (I/O) controller hub (SB/ICH) 2520. The central processing unit (CPU) 2530 is connected to NB/MCH 2525. The NB/MCH 2525 also connects to the memory 2545 via a memory bus, and connects to the graphics processor 2550 via an accelerated graphics port (AGP). The NB/MCH 2525 also connects to the SB/ICH 2520 via an internal bus (e.g., a unified media interface or a direct media interface). The CPU 2530 can contain one or more processors and even can be implemented using one or more heterogeneous processor systems.

Figure 8:
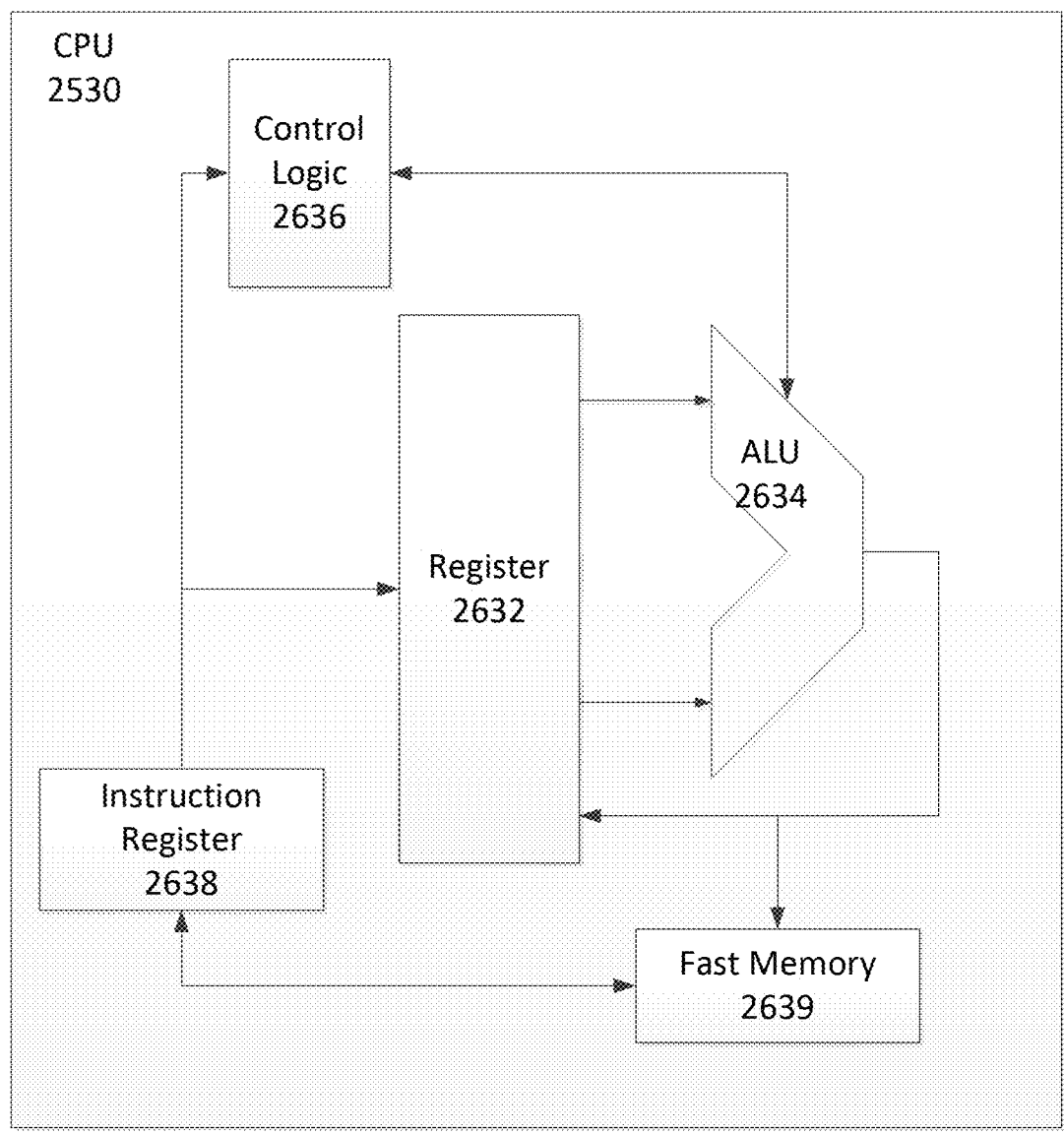
FIG. 8 is an implementation of a central processing unit, according to an exemplary aspect of the present disclosure.

FIG. 8 illustrates an implementation of CPU 2530. In one implementation, an instruction register 2638 retrieves instructions from a fast memory 2639. At least part of these instructions are fetched from an instruction register 2638 by a control logic 2636 and interpreted according to the instruction set architecture of the CPU 2530. Part of the instructions can also be directed to a register 2632. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 2634 that loads values from the register 2632 and performs logical and mathematical operations on the loaded values according to the instructions. The results from these operations can be fed back into the register 2632 and/or stored in a fast memory 2639. According to aspects of the disclosure, the instruction set architecture of the CPU 2530 can use a reduced instruction set computer (RISC), a complex instruction set computer (CISC), a vector processor architecture, or a very long instruction word (VLIW) architecture. Furthermore, the CPU 2530 can be based on the Von Neuman model or the Harvard model. The CPU 2530 can be a digital signal processor, an FPGA, an ASIC, a PLA, a PLD, or a CPLD. Further, the CPU 2530 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 7, the ECU 200 can include the SB/ICH 2520 being coupled through a system bus to an I/O Bus, a read only memory (ROM) 2556, universal serial bus (USB) port 2564, a flash binary input/output system (BIOS) 2568, and a graphics controller 2558. PCI/PCIe devices can also be coupled to SB/ICH 2520 through a PCI bus 2562.

The PCI devices can include, for example, Ethernet adapters, add-in cards, and PC cards for notebook computers. The Hard disk drive 2560 and CD-ROM 2566 can use, for example, an integrated drive electronics (IDE) or serial advanced technology attachment (SATA) interface. In one implementation the I/O bus can include a super I/O (SIO) device.

Further, the hard disk drive (HDD) 2560 and optical drive 2566 can also be coupled to the SB/ICH 2520 through a system bus. In one implementation, a keyboard 2570, a mouse 2572, a parallel port 2578, and a serial port 2576 can be connected to the system bus through the I/O bus. Other peripherals and devices can be connected to the SB/ICH 2520 using a mass storage controller such as SATA or PATA, an Ethernet port, an ISA bus, a LPC bridge, SMBus, a DMA controller, and an Audio Codec.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A clip release system for a vehicle door, comprising:
a clip including a stem and a clamping portion configured to hold a window;
a lock including a hole having an inner diameter, a first axial surface, a second axial surface, and at least one guide extending from the first axial surface to the second axial surface, the lock being disposed in the stem of the clip;
a bolt that rotates between a first position and a second position, is inserted through the hole of the lock in an insertion direction, and biased to move out of the lock in a direction opposite the insertion direction, the bolt including a head at a first end of the bolt, a shaft extending to a second end of the bolt, and at least one locking tab disposed on a surface of the shaft and configured to pass through the at least one guide, wherein
in the first position, the at least one locking tab is misaligned with the at least one guide and the at least one locking tab engages the second axial surface of the lock to prevent the bolt from disengaging from the lock,
in the second position, the at least one locking tab is aligned with the at least one guide and allows the bolt to disengage from the lock, and
a bias for the bolt being biased to move out of the lock in a direction opposite the insertion direction is provided by the shaft of the bolt having a tapered shape.

2. The clip release system of claim 1, further comprising:
a plunger including a top and a body, the body having a cross-sectional shape corresponding to a shape of a bolt drive disposed on the head of the bolt; and
a bracket including an opening configured to receive the bolt, wherein
the bolt is inserted through the opening of the bracket and the hole of the lock and reversibly fastens the clip to the bracket.

3. The clip release system of claim 2, wherein the plunger cooperates with the bolt.

4. The clip release system of claim 2, further comprising:
processing circuitry configured to
receive data from at least one sensor and transmit data to a motor;
upon receiving predetermined data from the at least one sensor, transmit a signal to the motor to rotate the bolt from the first position to the second position.

5. The clip release system of claim 4, wherein the motor rotates the bolt by driving the plunger to cooperate with the bolt.

6. The clip release system of claim 4, wherein the predetermined data indicates a collision has occurred.

7. The clip release system of claim 4, wherein
the window is disposed in an opening of the vehicle door; and
in response to the processing circuitry transmitting a signal to the motor to rotate the bolt from the first position to the second position,
the bolt is ejected from the lock and the bracket; and
the clip and the window fall into an interior of the vehicle door.

8. The clip release system of claim 1, wherein
the lock includes at least one notch, the at least one notch being a recess formed on the second axial surface of the lock; and
in the first position, the at least one locking tab comes to rest at least partially in the at least one notch and prevents additional rotation of the bolt.

9. The clip release system of claim 1, wherein a bias for the bolt being biased to move out of the lock in a direction opposite the insertion direction is provided by a spring.

10. A clip release system for a vehicle door, comprising:
a clip including a stem and a clamping portion configured to hold a window;
a lock including a hole having an inner diameter, a first axial surface, a second axial surface, and at least one guide extending from the first axial surface to the second axial surface, the lock being disposed in the stem of the clip;
a bolt that rotates between a first position and a second position, is inserted through the hole of the lock in an insertion direction, and biased to move out of the lock in a direction opposite the insertion direction, the bolt including a head at a first end of the bolt, a shaft extending to a second end of the bolt, and at least one locking tab disposed on a surface of the shaft and configured to pass through the at least one guide;
a plunger including a top and a body, the body having a cross-sectional shape corresponding to a shape of a bolt drive disposed on the head of the bolt;
a bracket including an opening configured to receive the bolt; and
processing circuitry configured to
receive data from at least one sensor and transmit data to a motor;
upon receiving predetermined data from the at least one sensor, transmit a signal to the motor to rotate the bolt from the first position to the second position, wherein
in the first position, the at least one locking tab is misaligned with the at least one guide and the at least one locking tab engages the second axial surface of the lock to prevent the bolt from disengaging from the lock,
in the second position, the at least one locking tab is aligned with the at least one guide and allows the bolt to disengage from the lock, and the bolt is inserted through the opening of the bracket and the hole of the lock and reversibly fastens the clip to the bracket.

11. The clip release system of claim 10, wherein the plunger cooperates with the bolt.

12. The clip release system of claim 10, wherein the lock includes at least one notch, the at least one notch being a recess formed on the second axial surface of the lock; and in the first position, the at least one locking tab comes to rest at least partially in the at least one notch and prevents additional rotation of the bolt.

13. The clip release system of claim 10, wherein a bias for the bolt being biased to move out of the lock in a direction opposite the insertion direction is provided by a spring.

14. The clip release system of claim 10, wherein the motor rotates the bolt by driving the plunger to cooperate with the bolt.

15. The clip release system of claim 10, wherein the predetermined data indicates a collision has occurred.

16. The clip release system of claim 10, wherein the window is disposed in an opening of the vehicle door; and in response to the processing circuitry transmitting a signal to the motor to rotate the bolt from the first position to the second position, the bolt is ejected from the lock and the bracket; and the clip and the window fall into an interior of the vehicle door.

* * * * *